(12) United States Patent
Huber et al.

(10) Patent No.: US 8,400,005 B2
(45) Date of Patent: Mar. 19, 2013

(54) GENERATING ENERGY FROM FLUID EXPANSION

(75) Inventors: David J. Huber, Tequesta, FL (US); Scott R. Myers, Spring Hill, FL (US)

(73) Assignee: General Electric Company, Schenectady, NY (US)

( * ) Notice: Subject to any disclaimer, the term of this patent is extended or adjusted under 35 U.S.C. 154(b) by 289 days.

(21) Appl. No.: 12/783,455

(22) Filed: May 19, 2010

(65) Prior Publication Data

US 2011/0283702 A1  Nov. 24, 2011

(51) Int. Cl.
*F01D 15/10* (2006.01)
(52) U.S. Cl. .......................................................... 290/52
(58) Field of Classification Search ...................... 290/52
See application file for complete search history.

(56) References Cited

U.S. PATENT DOCUMENTS

| | | |
|---|---|---|
| 2,917,636 A | 12/1959 | Skeley et al. |
| 4,301,375 A | 11/1981 | Anderson |
| 4,555,637 A | 11/1985 | Irvine |
| 4,558,228 A | 12/1985 | Larjola |
| 4,740,711 A | 4/1988 | Sato et al. |
| 5,083,040 A | 1/1992 | Whitford |
| 5,263,816 A | 11/1993 | Weimer et al. |
| 5,285,123 A | 2/1994 | Kataoka et al. |
| 5,481,145 A | 1/1996 | Canders et al. |
| 5,559,379 A | 9/1996 | Voss |
| 5,780,932 A | 7/1998 | Laffont |
| 5,818,242 A | 10/1998 | Grzybowski et al. |
| 6,177,735 B1 | 1/2001 | Chapman et al. |
| 6,259,166 B1 | 7/2001 | Tommer |
| 6,270,309 B1 | 8/2001 | Ghetzler et al. |
| 6,692,222 B2 | 2/2004 | Prinz et al. |
| 6,727,617 B2 | 4/2004 | McMullen et al. |
| 6,900,553 B2 | 5/2005 | Gozdawa |
| 6,960,840 B2 | 11/2005 | Willis et al. |
| 6,986,251 B2 | 1/2006 | Radcliff et al. |
| 7,125,223 B2 | 10/2006 | Turnquist et al. |
| 7,581,921 B2 | 9/2009 | Bagepalli et al. |
| 7,638,892 B2 | 12/2009 | Myers |
| 2007/0056285 A1 | 3/2007 | Brewinton |

(Continued)

FOREIGN PATENT DOCUMENTS

| | | |
|---|---|---|
| EP | 0 462 724 A1 | 12/1991 |
| EP | 1 905 948 A1 | 4/2008 |

(Continued)

OTHER PUBLICATIONS

International Search Report issued in connection with PCT/US2001/036638; Sep. 1, 2011.

(Continued)

*Primary Examiner* — Tho D Ta
(74) *Attorney, Agent, or Firm* — Fletcher Yoder P.C.

(57) ABSTRACT

A turbine wheel is rotatable in response to expansion of a working fluid flowing from near an inlet side towards an outlet side of the turbine wheel. The turbine wheel may receive the working fluid radially into the inlet side of the turbine wheel and output the working fluid axially from its outlet side. A generator has a stator and a rotor. The rotor may be coupled to the turbine wheel and may rotate at the same speed as the turbine wheel when the turbine wheel rotates. In certain instances, the generator is adjacent the inlet side of the turbine wheel.

27 Claims, 5 Drawing Sheets

U.S. PATENT DOCUMENTS

| | | |
|---|---|---|
| 2008/0246281 A1 | 10/2008 | Agrawal et al. |
| 2008/0250789 A1 | 10/2008 | Myers et al. |
| 2008/0252077 A1* | 10/2008 | Myers .............................. 290/52 |
| 2008/0252078 A1 | 10/2008 | Myers et al. |
| 2011/0289922 A1* | 12/2011 | Myers et al. .................... 60/651 |

FOREIGN PATENT DOCUMENTS

| | | | |
|---|---|---|---|
| GB | 2 225 813 A | | 6/1990 |
| GB | 2 405 450 A | | 3/2005 |
| JP | 55 075502 A | | 6/1980 |
| JP | 63-277443 A | | 11/1988 |
| JP | 3 271507 A | | 12/1991 |
| JP | 8 218816 A | | 8/1996 |
| JP | 9 112207 A | | 4/1997 |
| JP | 2007 127060 A | | 5/2007 |
| JP | 2007-127060 A | | 5/2007 |
| WO | 93/01397 A1 | | 1/1993 |
| WO | 2007/088194 A2 | | 8/2007 |
| WO | 2008/090628 A1 | | 7/2008 |

OTHER PUBLICATIONS

International Search Report issued in connection with PCT/US2001/037710; Oct. 4, 2011.

International Search Report issued in connection with PCT/US2011/037710, Oct. 4, 2011.

European Office Action issued in connection with EP Application No. 08 745 761.0, Jan. 1, 2011.

International Search Report issued in connection with PCT/US2011/036638, Sep. 1, 2011.

GE Oil & Gas, "*Turboexpander-Generators for Natural Gas Applications,*" [online], <http://www.ge-energy.com/businesses/ge_oilandgas/en/literature/en/downloads/turbo_generators.pdf>, 7 pages, retrieved May 19, 2010.

Atlas Copco, "*Atlas Copco Gas and Process Solutions, Driving Expander Technology,*" [online] <http://www.atlascopco-gap.com/download_file.php?id=457>, 24 pages, retrieved May 19, 2010.

Atlas Copco, "*Atlas Copco Gas and Process Solutions, GT and T Series: Process-engineered Centrifugal Compressors,*" [online], <http://www.atlascopco-gap.com/download_file.php?id=323>, 24 pages, retrieved May 19, 2010.

Atlas Copco, "*Atlas Copco Gas and Process Solutions, Producing Tomorrow's Energy,*" [online], <http://www.atlascopco-gap.com/download_file.php?id=458>, 8 pages, retrieved May 19, 2010.

\* cited by examiner

GENERATING ENERGY FROM FLUID EXPANSION

TECHNICAL FIELD

This document relates to the operation of a fluid expansion system, including some systems that comprise a turbine apparatus to generate energy from fluid expansion.

BACKGROUND

A number of industrial processes create heat as a byproduct. In some circumstances, this heat energy is considered "waste" heat that is dissipated to the environment. Exhausting or otherwise dissipating this "waste" heat generally hinders the recovery of this heat energy for conversion into other useful forms of energy, such as electrical energy.

SUMMARY

In certain instances, an apparatus includes a turbine wheel configured to receive the working fluid and rotate in response to expansion of a working fluid flowing from the inlet side to the outlet side. The apparatus also includes an electric generator having a stator and a rotor and residing on the inlet side of the turbine wheel, the rotor coupled to the turbine wheel to rotate at the same speed as the turbine wheel when the turbine wheel rotates.

In certain instances, a generator system for use in a Rankine cycle includes a liquid reservoir for a working fluid of the Rankine cycle, a pump device coupled to the liquid reservoir to receive the working fluid from the liquid reservoir, an evaporator heat exchanger coupled to the pump to receive the working fluid from the pump and apply heat to the working fluid, and a condenser heat exchanger coupled to a turbine generator apparatus to receive the working fluid from the turbine generator apparatus and extract heat from the working fluid. The turbine generator apparatus may be coupled to the evaporator heat exchanger to receive the working fluid from the evaporator heat exchanger and may be configured to generate electrical energy in response to expansion of the working fluid. The turbine generator apparatus may include a turbine wheel configured to receive the working fluid radially into an inlet side of the turbine wheel and output the working fluid axially from an outlet side of the turbine wheel and rotate in response to expansion of a working fluid flowing from the inlet side to the outlet side. The turbine generator apparatus may also include an electric generator having a stator and a rotor and residing on the inlet side of the turbine wheel, the rotor coupled to the turbine wheel to rotate at the same speed as the turbine wheel when the turbine wheel rotates.

In certain instances, a method of circulating a working fluid through a working cycle includes vaporizing the working fluid and receiving the vaporous working fluid into a radial inlet of a turbine wheel. The method may also include rotating the turbine wheel in response to expansion of the working fluid through the turbine wheel, and in turn rotating a rotor of a generator at the same speed as the turbine wheel. The working fluid may be output axially from an outlet side of the turbine wheel away from the rotor. The method may also include condensing the working fluid to a liquid.

In aspects of the embodiments, the turbine wheel may be configured to receive the working fluid radially into an inlet side of the turbine wheel and output the working fluid axially from an outlet side of the turbine wheel.

In aspects of the embodiments, the turbine wheel and the rotor are affixed to a common shaft. The turbine wheel may be affixed directly to the rotor in certain aspects.

In aspects of the embodiments, the rotor and the turbine wheel of the turbine generator apparatus may be coupled to rotate together without a gear box.

In aspects of the embodiments, the stator and the rotor are isolated from contact with the working fluid.

In aspects of the embodiments, the electric generator further comprises at least one magnetic bearing supporting the rotor relative to the stator.

In aspects of the embodiments, the evaporator heat exchanger is in thermal communication with a source of waste heat from a separate process.

In aspects of the embodiments, the working fluid is an organic working fluid. In some embodiments, the working cycle is an organic Rankine working cycle.

In aspects of the embodiments, the working fluid (or some part thereof) may be directed through the electric generator to cool the rotor and the stator. The working fluid may be directed from an outlet of the generator to the inlet of the turbine wheel, rotating the turbine wheel and the rotor of the electric generator.

DETAILED DESCRIPTION

A turbine generator apparatus generates electrical energy from rotational kinetic energy derived from expansion of a gas through a turbine wheel. For example, rotation of the turbine wheel can be used to rotate a magnetic rotor within a stator, which then generates electrical energy. The generator resides on the inlet side of the turbine wheel, and in certain instances is isolated from contact with the gas.

Figure 1:
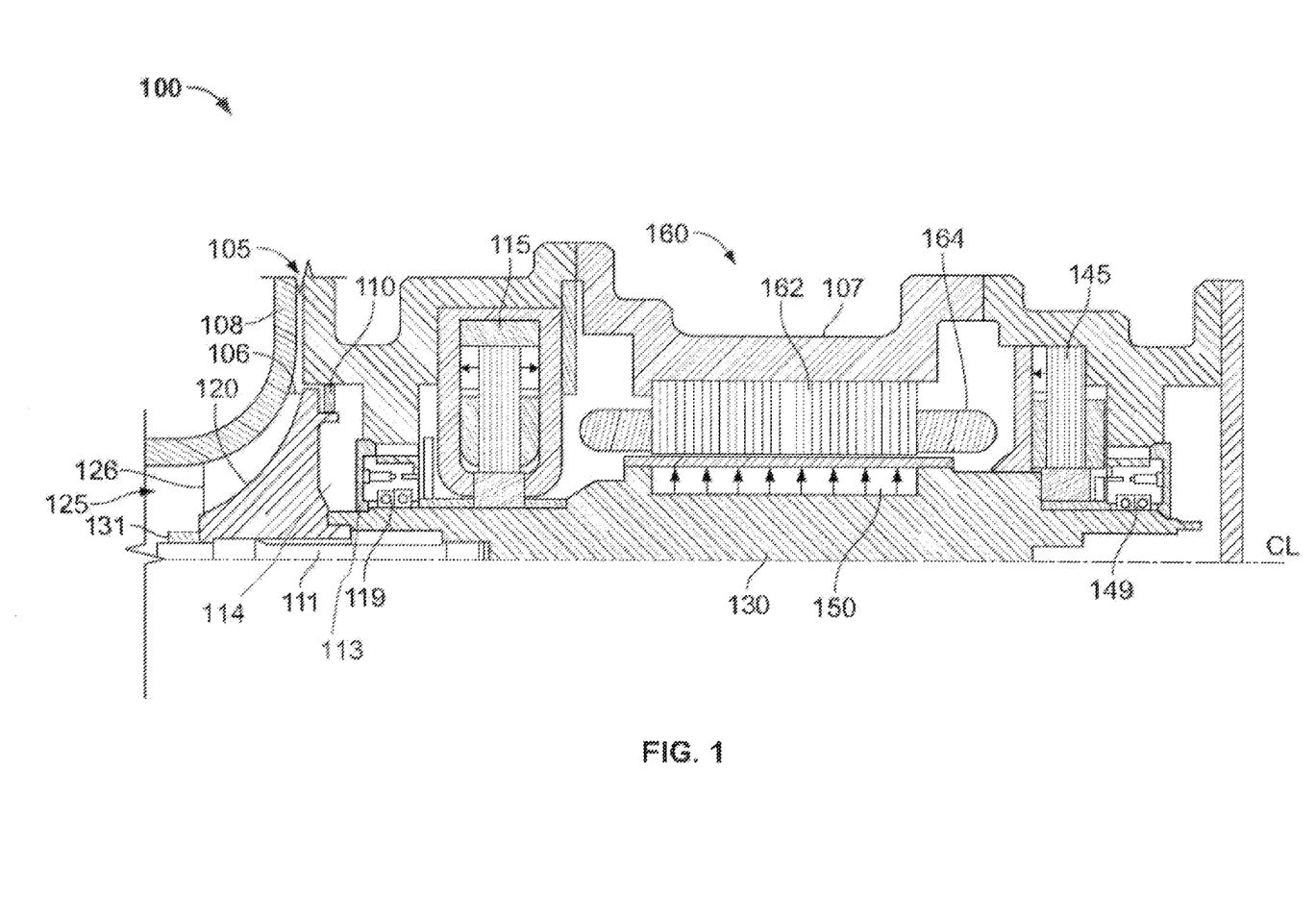
FIG. 1 is a cross-sectional view of a turbine generator apparatus in accordance with the present disclosure.

Referring to FIG. 1, an electric power generation system may comprise a turbine generator apparatus 100 in which electricity is generated from expansion of a working fluid. The turbine generator apparatus 100 can be part of a closed system, such as a Rankine cycle, organic Rankine cycle or the like, in which a pressurized and heated working fluid is permitted to expand and release energy in the turbine generator apparatus 100. For example, the heated and pressurized working fluid may enter the turbine generator apparatus 100 through an inlet conduit 105, and after expanding, exit the turbine generator apparatus 100 through an outlet conduit 125.

The turbine wheel 120 is a radial inflow turbine wheel configured to rotate as the working fluid expands through the turbine wheel 120. The working fluid flows from the inlet conduit 105 into a radial inlet 106 of the turbine wheel 120, and flows from an axial outlet 126 of the turbine wheel 120 to the outlet conduit 125. The turbine wheel 120 is contained in a turbine housing 108. In certain instances, the turbine wheel 120 is a shrouded turbine wheel. In other embodiments, the shroud can be omitted and the turbine wheel 120 can substantially seal against the interior of the turbine housing 108. Different configurations of turbine wheels can be used. For example, in embodiments, the turbine wheel may be an axial inflow, multi-stage turbine having either a radial or axial outlet. The turbine wheel 120 is coupled to a rotor 130 of a generator 160. As such, the turbine wheel 120 is driven to rotate by the expansion of the working fluid, and in turn, the rotor 130 (including the magnets 150) rotates in response to the rotation of the turbine wheel 120.

In some embodiments, the working fluid (or some part of the working fluid) may pass through the generator before entering the turbine inlet. In certain instances of the embodiments, the turbine may include a flow diverter to redirect the flow from the generator to a radial inlet of the turbine for radial inflow turbine wheels. Alternatively, the turbine wheel may be an axial turbine wheel and may receive the working fluid from the electric generator. The working fluid may cool the generator or parts of the generator, such as the rotor and/or the stator.

In certain instances, the turbine wheel 120 is directly affixed to the rotor 130, or to an intermediate common shaft, for example, by fasteners, rigid drive shaft, welding, or other manner. FIG. 1 shows the turbine wheel 120 received over an end of the rotor 130, and held to the rotor 130 with a shaft 111. The shaft 111 threads into the rotor 130 at one end, and at the other, captures the turbine wheel 120 between the end of rotor 130 and a nut 131 threadingly received on the shaft 111. The turbine wheel 120 and rotor 130 are coupled without a gearbox and rotate at the same speed. In other instances, the turbine wheel 120 can be indirectly coupled to the rotor 130, for example, by a gear train, clutch mechanism, or other manner.

The turbine housing 108 is affixed to a generator casing 107 that contains the rotor 130, as well as a stator 162 of the generator 160. A circumferential seal 110 is provided to seal between the turbine wheel 120 and the interior of the casing 107. Seal 110 provides leakage control and contributes to thrust balance. In some embodiments, a pressure in cavity 114 may be applied to balance thrust. Pressure may be applied using a balance piston or by other techniques known to those of skill in the art. In addition, a tight shaft seal 113 is provided to prevent passage of working fluid in and around the turbine wheel 120 into the interior of the generator 160. The shaft seal 113 isolates the rotor 130 and the stator 162 from contact with the working fluid, and may be disposed between cavity 114 and the generator 160.

As shown in FIG. 1, bearings 115 and 145 are arranged to rotatably support the rotor 130 and turbine wheel 120 relative to the stator 162, and the generator casing 107. The turbine wheel 120 is supported in a cantilevered manner by the bearings 115 and 145. In embodiments, the turbine wheel may be supported in a non-cantilevered manner and bearings 115 and 119 may be located on the outlet side of the turbine wheel 120. In certain instances, one or more of the bearings 115 or 145 can include ball bearings, needle bearings, magnetic bearings, journal bearings, or other. The bearings 115 and 145 need not be the same types of bearings. In certain instances, the bearings 115 and 145 comprise magnetic bearings. U.S. Pat. No. 6,727,617 assigned to Calnetix, Inc. describes bearings suitable for use as bearings 115 and 145. Bearing 115 is a combination radial and thrust bearing, supporting the rotor 130 in radial and axial directions. Bearing 145 is a radial bearing, supporting the rotor 130 radially. Other configurations could be utilized.

In the embodiments in which the bearings 115 and 145 are magnetic bearings, the turbine generator apparatus 100 may include one or more backup bearings. For example, at start-up and shut down or in the event of a power outage that affects the operation of the magnetic bearings 115 and 145, first and second backup bearings 119 and 149 may be employed to rotatably support the turbine wheel 120 during that period of time. The first and second backup bearings 119 and 149 may comprise ball bearings, needle bearings, journal bearings, or the like. In certain instances, the first backup bearing 119 includes ball bearings that are arranged near the first magnetic bearing 115. Also, the second backup bearing 149 includes ball bearings that are arranged near the second magnetic bearing 145. Thus, in certain instances, even if the first and second bearings 115 and 145 temporarily fail (e.g., due to an electric power outage or other reason), the first and second backup bearings 119 and 149 would continue to support both the turbine wheel 120 and the rotor 130.

The turbine generator apparatus 100 is configured to generate electricity in response to the rotation of the rotor 130. In certain instances, the rotor 130 can include one or more permanent magnets 150. The stator 162 includes a plurality of conductive coils. Electrical current is generated by the rotation of the magnet 150 within the coils of the stator 162. The rotor 130 and stator 162 can be configured as a synchronous, permanent magnet, multiphase AC generator. In certain instances, stator 162 may include coils 164. When the rotor 130 is rotated, a voltage is induced in the stator coil 164. At any instant, the magnitude of the voltage induced in coils 164 is proportional to the rate at which the magnetic field encircled by the coil 164 is changing with time (i.e., the rate at which the magnetic field is passing the two sides of the coil 164). In instances where the rotor 130 is coupled to rotate at the same speed as the turbine wheel 120, the turbine generator apparatus 100 is configured to generate electricity at that speed. Such a turbine generator apparatus 100 is what is referred to as a "high speed" turbine generator.

Figure 2:
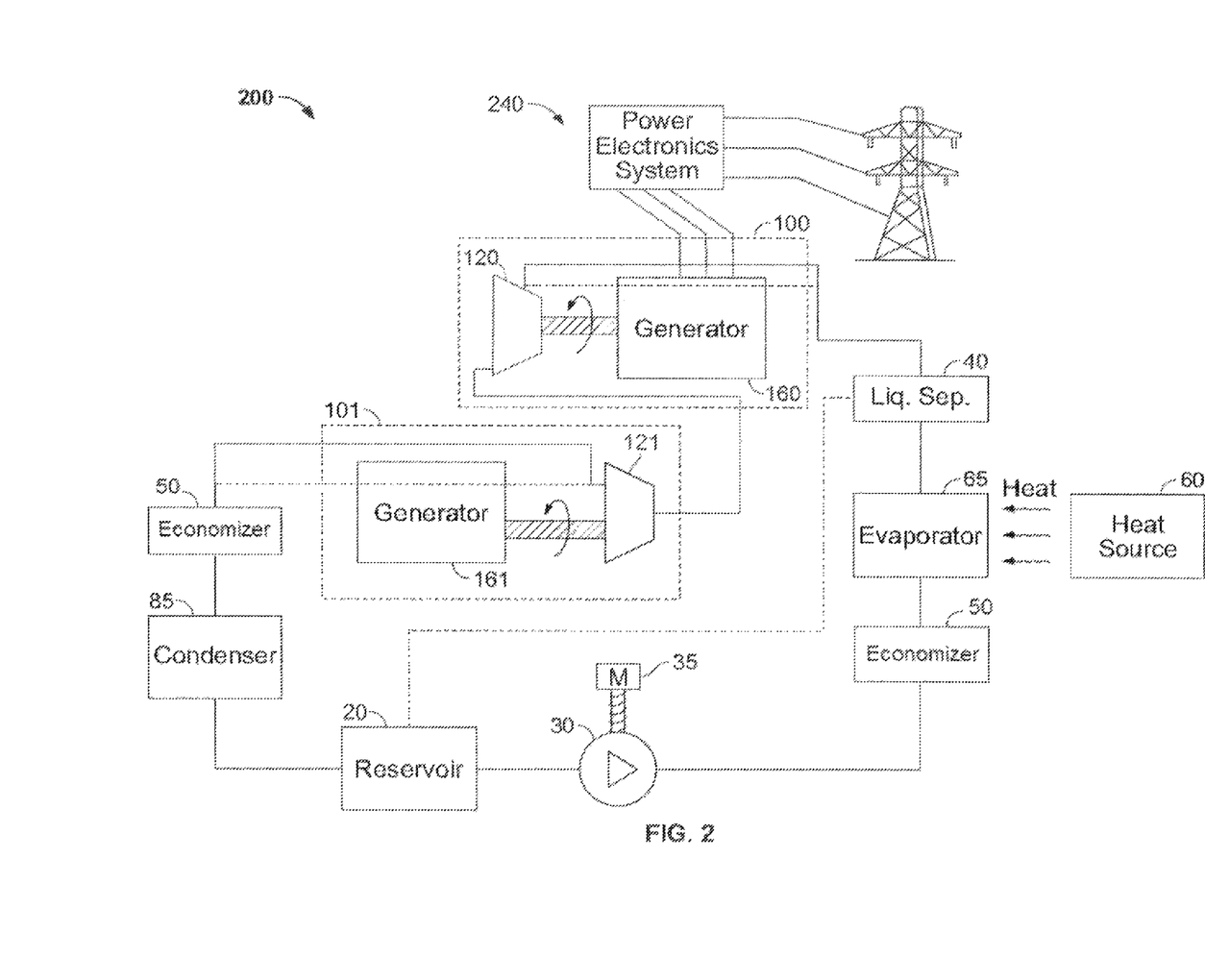
FIG. 2 is a schematic of an electrical power generation system incorporating a turbine generator apparatus, in accordance with the present disclosure.

Referring now to FIG. 2, embodiments of the turbine generator apparatus 100 can be used in a Rankine cycle 200 that recovers waste heat from one or more industrial processes. For example, the Rankine cycle 200 may comprise an organic Rankine cycle that employs an engineered working fluid to receive waste heat from a separate process. In certain instances, the working fluid may be a refrigerant (e.g., an HFC, CFC, HCFC, ammonia, water, or other refrigerant), such as, for example, R245fa. As such, the turbine generator apparatus 100 can be used to recover waste heat from industrial applications and then to convert the recovered waste heat into electrical energy. Furthermore, the heat energy can be recovered from geo-thermal heat sources and solar heat sources. In some circumstances, the working fluid in such a Rankine cycle 200 may comprise a high molecular mass organic fluid that is selected to efficiently receive heat from relatively low temperature heat sources. Although the turbine generator apparatus 100 and other components are depicted in the Rankine cycle 200, it should be understood from the description herein that some components that control or direct fluid flow are excluded from view in FIG. 2 merely for illustrative purposes.

In certain instances, the turbine generator apparatus 100 can be used to convert heat energy from a heat source into kinetic energy (e.g., rotation of the rotor), which is then converted into electrical energy. For example, the turbine generator apparatus 100 may output electrical power that is configured by a power electronics package to be in form of 3-phase 60 Hz power at a voltage of about 400 VAC to about 480 VAC. Alternative embodiments may output electrical power having other selected settings. In certain instances, the turbine generator apparatus 100 may be configured to provide an electrical power output of about 2 MW or less, about 50 kW to about 1 MW, and about 100 kW to about 300 kW, depending upon the heat source in the cycle and other such factors. Again, alternative embodiments may provide electrical power at other power outputs. Such electrical power can be transferred to a power electronics system and, in certain instances, to an electrical power grid system.

The Rankine cycle 200 may include a pump device 30 that pumps the working fluid. The pump device 30 may be coupled to a liquid reservoir 20 that contains the working fluid, and a pump motor 35 can be used to operate the pump. The pump device 30 may be used to convey the working fluid to an evaporator heat exchanger 65 of the Rankine cycle 200. Evaporator heat exchanger 65 may receive heat from a heat source 60. As shown in FIG. 2, the heat source 60 may include heat that is recovered from a separate process (e.g., an industrial process in which heat is byproduct). Some examples of heat source 60 include commercial exhaust oxidizers (e.g., a fan-induced draft heat source bypass system, a boiler system, or the like), refinery systems that produce heat, foundry systems, smelter systems, landfill flare gas and generator exhaust, commercial compressor systems, solar heaters, food bakeries, geo-thermal sources, solar thermal sources, and food or beverage production systems. In such circumstances, the working fluid may be directly heated by the separate process or may be heated in a heat exchanger in which the working fluid receives heat from a byproduct fluid of the process. In certain instances, the working fluid can cycle through the heat source 60 so that all or a substantial portion of the fluid is converted into gaseous state. Accordingly, the working fluid is heated by the heat source 60.

Typically, working fluid at a low temperature and high pressure liquid phase from the pump 30 is circulated into one side of the economizer 50 while working fluid at a high temperature and low pressure vapor phase is circulated into another side of the economizer 50 with the two sides being thermally coupled to facilitate heat transfer there between. Although illustrated as separate components, the economizer 50 may be any type of heat exchange device, such as, for example, a plate and frame heat exchanger or a shell and tube heat exchanger or other device.

The evaporator heat exchanger 65 may also be a plate and frame heat exchanger. The evaporator may receive the working fluid from the economizer 50 at one side and receive a supply thermal fluid at another side, with the two sides of the evaporator heat exchanger 65 being thermally coupled to facilitate heat exchange between the thermal fluid and working fluid. For instance, the working fluid enters the evaporator heat exchanger 65 from the economizer 50 in liquid phase and is changed to a vapor phase by heat exchange with the thermal fluid supply. The evaporator heat exchanger 65 may be any type of heat exchange device, such as, for example, a shell and tube heat exchanger or other device.

Liquid separator 40 may be arranged upstream of the turbine generator apparatus 100 so as to separate and remove a substantial portion of any liquid state droplets or slugs of working fluid that might otherwise pass into the turbine generator apparatus 100. Accordingly, in certain instances of the embodiments, the gaseous state working fluid can be passed to the turbine generator apparatus 100 while a substantial portion of any liquid-state droplets or slugs are removed and returned to the reservoir 212.

Referring briefly to FIG. 1, after passing through the liquid separator 40, the heated and pressurized working fluid may pass through the inlet conduit 105 and toward the turbine wheel 120. The working fluid expands as it flows across the turbine wheel 120 and into the body casing 107, thereby acting upon the turbine wheel 120 and causing rotation of the turbine wheel 120. Accordingly, the turbine generator apparatus 100 can be included in a fluid expansion system in which kinetic energy is generated from expansion of the working fluid. The rotation of the turbine wheel 120 is translated to the rotor 130, which in certain instances includes the magnet 150 that rotates within an electrical generator device 160. As such, the kinetic energy of the turbine wheel 120 is used to generate electrical energy. The electrical energy output from the electrical generator device 160 can be transmitted via one or more connectors (e.g., three connectors may be employed in certain instances). As mentioned above in connection to FIG. 2, in certain instances, the working fluid may be directed through the generator 160 before it enters the turbine wheel 120. For example, the working fluid may pass through a gap between the rotor 130 and the stator 162 within the generator housing 107. The working fluid may cool the generator 160.

Referring to FIG. 2, in certain instances, the electrical energy can be communicated via the connectors to a power electronics system 240 that is capable of modifying the electrical energy. In one example, the power electronics system 240 may be connected to an electrical power grid system. As previously described, in certain instances, the turbine generator apparatus 100 may be configured to provide an electrical power output of about 2 MW or less, about 50 kW to about 1 MW, and about 100 kW to about 300 kW, depending upon the heat source 60, the expansion capabilities of the working fluid, and other such factors. In certain instances, the electrical energy output by the turbine generator apparatus 100 can be supplied directly to an electrically powered facility or machine.

In certain instances of the Rankine cycle 200, the working fluid may flow from the outlet conduit 109 of the turbine generator apparatus 100 to a condenser heat exchanger 85. The condenser heat exchanger 85 is used to remove heat from the working fluid so that all or a substantial portion of the working fluid is converted to a liquid state. In certain instances, a forced cooling airflow or water flow is provided over the working fluid or the condenser heat exchanger 85 to facilitate heat removal. After the working fluid exits the condenser heat exchanger 85, the fluid may return to the liquid reservoir 20 where it is prepared to flow again though the cycle 200.

In some embodiments, the working fluid returned from the condenser heat exchanger 85 enters the receiver 335 and is then pressurized by the pump 30. The working fluid is then circulated to the cold side of the economizer 50, where heat therefrom is transferred to the working fluid (e.g., from the hot side to the cold side of the economizer 50). Working fluid exits the cold side of the economizer 50 in liquid phase and is circulated to an evaporator (not shown), thereby completing or substantially completing the thermodynamic cycle.

In certain instances, the working fluid may be directed from the outlet conduit 109 to the inlet of a second turbine generator apparatus 101. Turbine generator apparatus may be of a type similar to that shown in FIG. 1 or of another type. In certain instances, turbine generator apparatus 101 may be of a similar type to that described in U.S. Pat. No. 7,638,892 and U.S. Patent Publication No. 2008/0250789. In embodiments, turbine generator apparatus 101 may include a turbine wheel 121. The working fluid may cause the turbine wheel 121 may rotate, which in some instances expands the working fluid as it passes through the turbine wheel. In some instances, a portion of the working fluid may pass across the rotor of generator 161 and may cool the components of generator 161. FIG. 2 shows that the turbine wheel 121 is affixed to a generator 161, which may be a generator of a similar type shown in FIG. 1 (or in the patents/publications described above) that includes a rotor and a stator. Turbine wheel 121 may be affixed to generator 161 by a rotatable shaft that rotates with turbine wheel 121, causing a rotor of generator 161 to rotate. In embodiments, generator 161 may be any type of generator that generates power based on rotation of a turbine wheel. In some embodiments, the turbine wheel 121 may be affixed to a different device other than a generator without deviating from the scope of the disclosure.

Figure 3A:
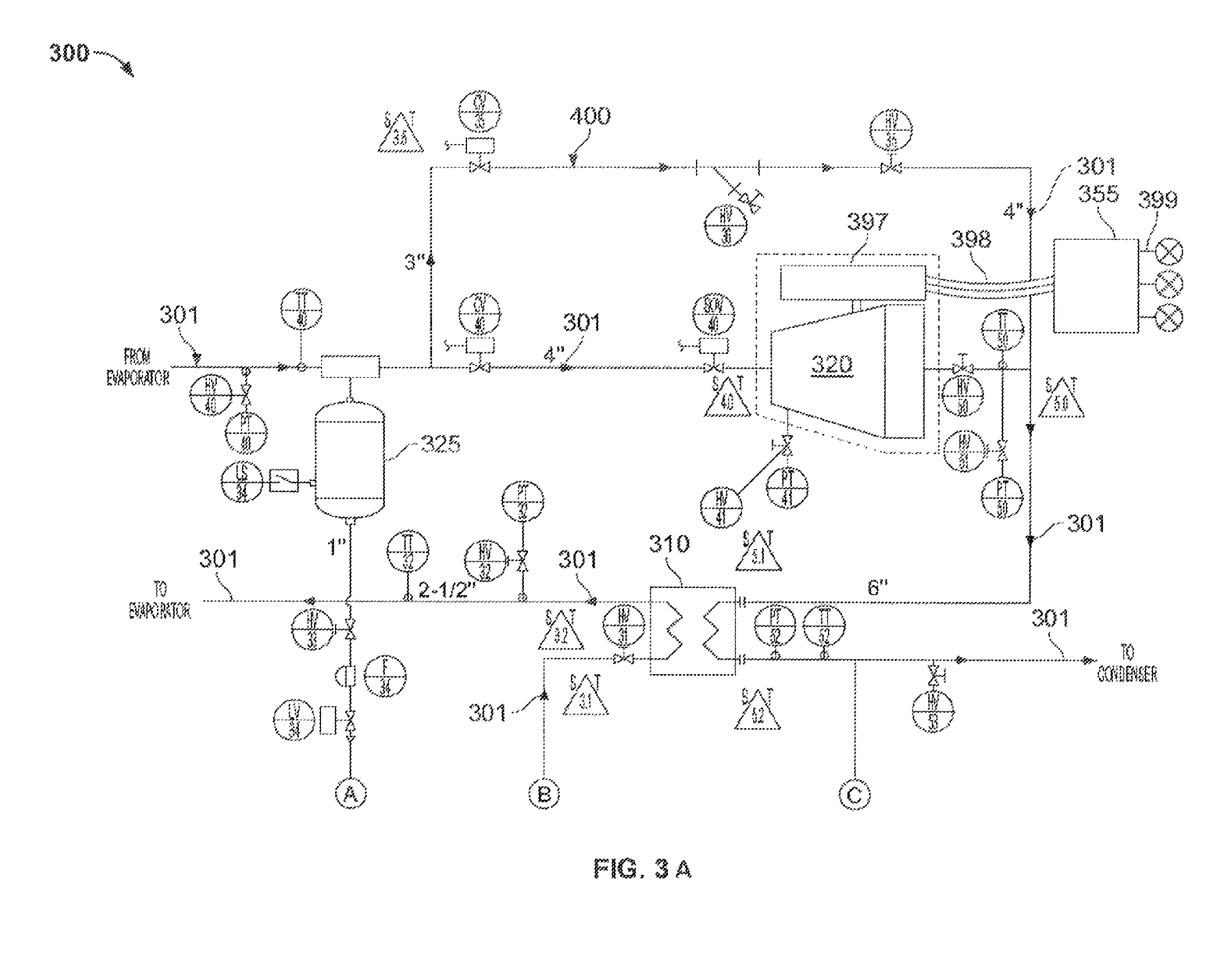
FIG. 3A is a schematic of a closed loop cycle incorporating a turbine generator apparatus in accordance with the present disclosure.
Figure 3B:
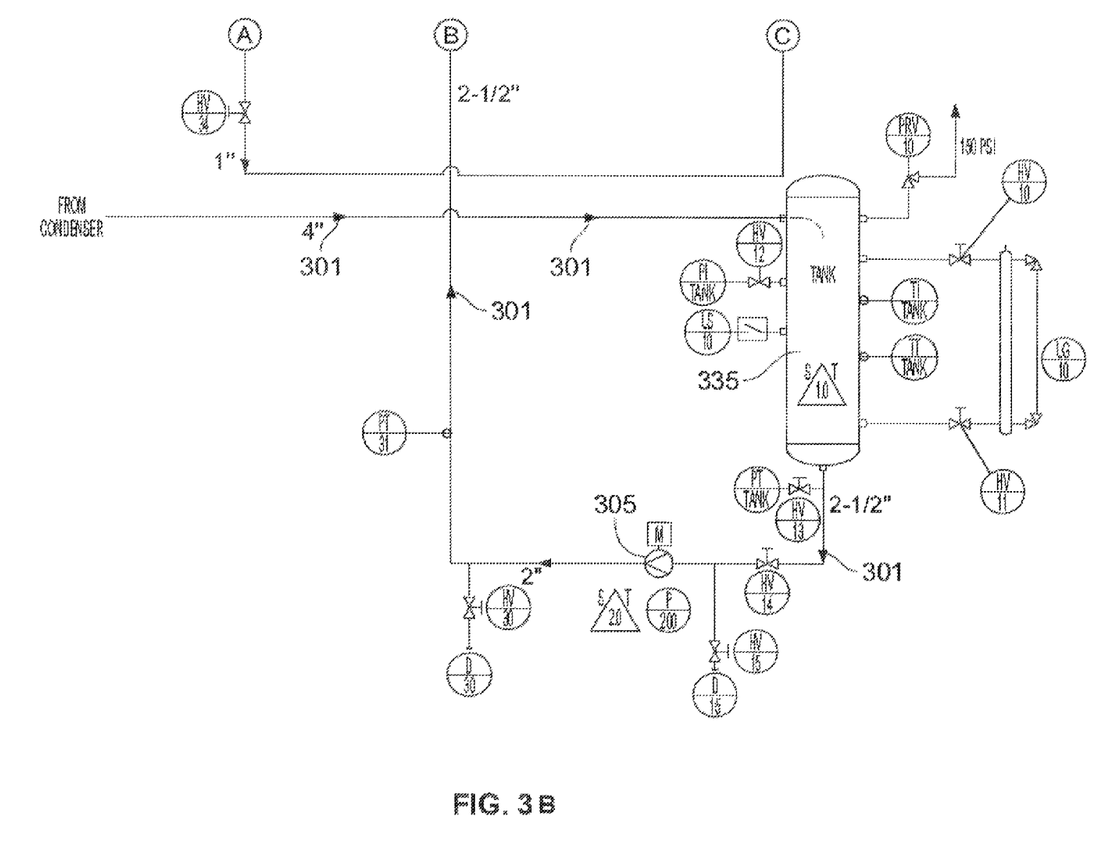
FIG. 3B is a continuation of the schematic of FIG. 3A showing a closed loop cycle incorporating a turbine generator apparatus in accordance with the present disclosure.

FIGS. 3A-B illustrates an example process diagram showing one example of a power generation system 300. FIG. 3A continues onto FIG. 3B, where point Ⓐ of FIG. 3A connects with point Ⓐ of FIG. 3B. Likewise, point Ⓑ of FIG. 3A connects to point Ⓑ of FIG. 3B, and point Ⓒ of FIG. 3A connects to point Ⓒ of FIG. 3B. As illustrated, the process diagram of FIGS. 3A-B may include more detail and show more components (e.g., sensors such as temperature and pressure sensors or transducers ("PT" and "TT"); valves such as control valves ("CV"), solenoid operated valves ("SOV") and hand valves ("HV"); fittings; or other components) as compared to FIG. 2. Although some components of power generation system 300 are shown as single components, the present disclosure contemplates that each single component may be multiple components performing identical or substantially identical functions (e.g., reference to economizer 310 encompasses references to multiple economizers). Likewise, although some components of power generation system 300 are shown as multiple components, the present disclosure contemplates that multiple, identical components may be a single component performing the identical or substantially identical functions as the multiple components (e.g., reference to turbine expander 320 encompasses reference to a single turbine expander 320).

Power generation system 300 includes a working fluid pump 305, an economizer 310, a turbine expander 320 coupled to a generator 397, a receiver 335, and power electronics 355. A working fluid 301 circulates through the components of power generation system 300 in a thermodynamic cycle (e.g., a closed Rankine cycle) to drive the turbine expander 320 and generate AC power 398 by the generator 397. The power generation system 300 may utilize a thermal fluid (e.g., a fluid heated by waste heat, a fluid heated by generated heat, or any other heated fluid) to drive one or more turbine expanders by utilizing a closed (or open) thermodynamic cycle to generate electrical power. In some embodiments, each turbine expander 320 may capable of rotating at rotational speeds up to 26,500 rpm or higher to drive a generator (as a component of or electrically coupled to the turbine expander 320) producing up to 125 kW or higher AC power. AC power 399 may be at a lower frequency, a higher or lower voltage, or both a lower frequency and higher or lower voltage relative to AC power 398. For instance, AC power 399 may be suitable for supplying to a grid operating at 60 Hz and between 400-480V.

In operation, power generation system 300 circulates a working fluid 301 through the turbine expander 320 to drive (i.e., rotate) the turbine expander 320. Turbine expander 320 drives the generator 397, which generates AC power 398. The working fluid 301 exhausts from the turbine expander 320 and, typically, is in vapor phase at a relatively lower temperature and pressure.

The economizer 310, as illustrated, is a plate and frame heat exchanger that is fluidly coupled with the outlet of the pump 305 and an inlet of the condenser. Typically, working fluid 301 at a low temperature and high pressure liquid phase from the pump 305 is circulated into one side of the economizer 310 while working fluid 301 at a high temperature and low pressure vapor phase (from an exhaust header) is circulated into another side of the economizer 310 with the two sides being thermally coupled to facilitate heat transfer there between. Although illustrated as a plate and frame heat exchanger, the economizer 310 may be any other type of heat exchange device, such as, for example, a shell and tube heat exchanger or other device.

The evaporator (not shown) may also be a plate and frame heat exchanger. The evaporator heat exchanger may receive the working fluid 301 from the economizer 310 at one side and receive a supply thermal fluid at another side, with the two sides of the evaporator heat exchanger being thermally coupled to facilitate heat exchange between the thermal fluid and working fluid 301. For instance, the working fluid 301 enters the evaporator heat exchanger from the economizer 310 in liquid phase and is changed to a vapor phase by heat exchange with the thermal fluid supply. The evaporator heat exchanger may be any type of heat exchange device, such as, for example, a shell and tube heat exchanger or other device.

Liquid separator 325 may be arranged upstream of the turbine 320 so as to separate and remove a substantial portion of any liquid-state droplets or slugs of working fluid that might otherwise pass into the turbine 320. Accordingly, the gaseous state working fluid can be passed to the turbine 320 while a substantial portion of any liquid-state droplets or slugs are removed and returned to the reservoir 335 via the condenser heat exchanger.

Working fluid 301 enters the economizer 310 at both sides of the economizer 310 (i.e., the hot and cold sides), where heat energy is transferred from the hot side working fluid 301 (i.e., vapor phase) to the cold side working fluid 301 (i.e., liquid phase). The working fluid 301 exits the hot side of the economizer 310 to a condenser heat exchanger (not shown) as vapor. The working fluid 301 returns from the condenser heat exchanger in liquid phase, having undergone a phase change from vapor to liquid in the condenser by, for example, convective heat transfer with a cooling medium (e.g., air, water, or other gas or liquid).

The working fluid 301 returned from the condenser enters the receiver 335 and is then pressurized by the pump 305. The working fluid 301 is then circulated to the cold side of the economizer 310, where heat therefrom is transferred to the working fluid 301 (e.g., from the hot side to the cold side of the economizer 310). Working fluid 301 exits the cold side of the economizer 310 in liquid phase and is circulated to an evaporator (not shown), thereby completing or substantially completing the thermodynamic cycle.

In the illustrated embodiment, the power generation system 300 includes a bypass 380, which allows vapor working fluid 301 to bypass the turbine expander 320 and merge into an exhaust of the turbine expander 320. In some embodiments, this may allow for better and/or more exact control of the power generation system 300 and, more particularly, for example, to maintain an optimum speed of the turbine expander 320. In addition, the bypass permits system cleaning and emergency disconnect capabilities.

Figure 4:
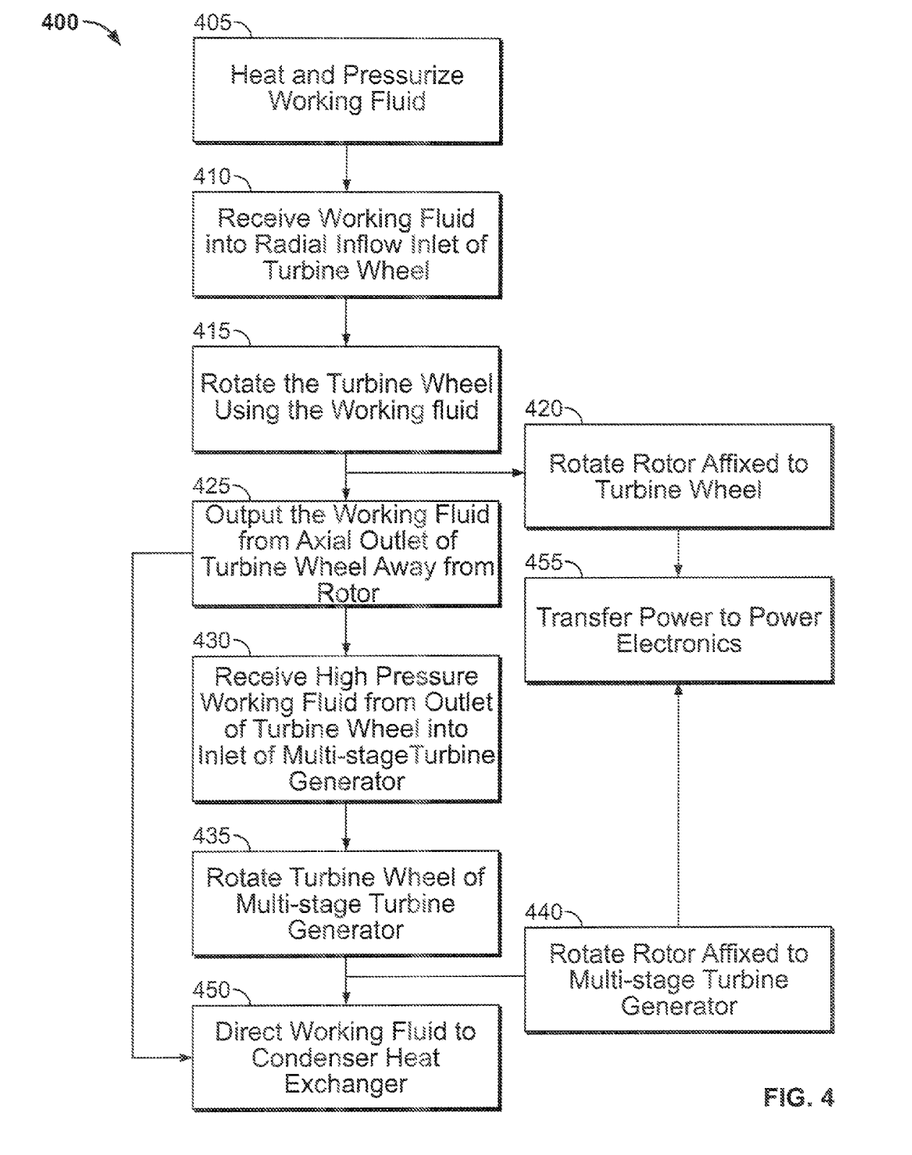
FIG. 4 is a process flow diagram showing one example operation of a turbine generator consistent with the present disclosure.

FIG. 4 is a process flow diagram showing steps to generate electrical energy from the turbine generator apparatus of the present disclosure. Steps of process flow diagram 400 are shown in a certain order, but it is to be understood by those of skill in the art that the order of the steps may be changed or added to without deviating from the scope of the disclosure. A working fluid is directed from a reservoir by a pump to an evaporator heat exchanger (405). The evaporator heat exchanger may receive heat from a heat source, such as an industrial application. In certain instances, the working fluid may be directed to the heat source without going through the heat exchanger. Heated and pressurized working fluid is directed to a turbine generator apparatus (410). In certain instances, the working fluid is directed to a radial inflow turbine wheel. The working fluid may enter the turbine wheel radially, expanding as it passes through the turbine wheel, and exits the turbine wheel axially. Other turbine wheel configurations may also be used. For example, the working fluid may be directed into the turbine wheel of a multi-stage turbine axially and output therefrom axially or radially. As the working fluid passes through the turbine wheel, the turbine wheel rotates (415). In certain instances, the turbine wheel is affixed to a rotor of a generator device, which rotates with the turbine wheel (420). The rotor may be directly connected to the turbine wheel by a common shaft, and may rotate at the same speed as the turbine wheel. In embodiments, the rotor and the turbine wheel may be magnetically coupled. In certain instances, the working fluid enters the turbine wheel proximate an inlet side and is output from the turbine wheel away from the generator device (425). The working fluid may directed from the outlet of the turbine wheel to a condenser heat exchanger (450). In certain instances, the turbine generator may be a high pressure, single-stage turbine generator, and the working fluid may be directed from the high pressure generator to a multi-stage turbine generator (430). The multi-stage generator may have a radial inflow turbine wheel or may have an axial inlet. The turbine wheel of the multi-stage generator may rotate in response to the flow of the working fluid (435). In certain instances, the rotation of the turbine wheel of the multi-stage generator rotates a rotor (440). Rotation of the rotor of either the single-stage or multi-stage rotors may be used to generate power, which is transferred to power electronics (455), which can modify and control the power output to a grid.

A number of embodiments of the invention have been described. Nevertheless, it will be understood that various modifications may be made without departing from the spirit and scope of the invention. Accordingly, other embodiments are within the scope of the following claims.

What is claimed is:
1. An apparatus comprising:
 a first turbine generator apparatus, comprising:
  a first turbine wheel configured to receive a working fluid and rotate in response to expansion of the working fluid flowing from a first inlet side of the first turbine wheel to a first outlet side; and
  a first electric generator having a first stator and a first rotor, the first rotor coupled to the first turbine wheel to rotate at the same speed as the first turbine wheel when the first turbine wheel rotates; and
 a second turbine generator apparatus, comprising:
  a second turbine wheel configured to receive the working fluid from the first turbine generator apparatus and rotate in response to expansion of the working fluid flowing from a second inlet side of the second turbine wheel to a second outlet side; and
  a second electric generator having a second stator and a second rotor, the second rotor coupled to the second turbine wheel to rotate at the same speed as the second turbine wheel when the second turbine wheel rotates, and wherein the first outlet side of the first turbine wheel is coupled to the second inlet side of the second turbine wheel.

2. The apparatus of claim 1, wherein at least one of the first turbine wheel is configured to receive the working fluid radially into the first inlet side of the first turbine wheel and output the working fluid axially from the first outlet side of the first turbine wheel, or the second turbine wheel is configured to receive the working fluid radially into the second inlet side of the second turbine wheel and output the working fluid axially from the second outlet side of the second turbine wheel.

3. The apparatus of claim 1, wherein at least one of the first turbine wheel and the first rotor are affixed to a first common shaft, or the second turbine wheel and the second rotor are affixed to a second common shaft.

4. The apparatus of claim 1, wherein at least one of the first turbine wheel is affixed directly to the first rotor, or the second turbine wheel is affixed directly to the second rotor.

5. The apparatus of claim 1, wherein at least one of the first rotor and the first turbine wheel are coupled to rotate together without a gear box, or the second rotor and the second turbine wheel are coupled to rotate together without the gear box.

6. The apparatus of claim 1, wherein at least one of the first stator and the first rotor are isolated from contact with the working fluid, or the second stator and the second rotor are isolated from contact with the working fluid.

7. The apparatus of claim 1, wherein at least one of the first electric generator comprises at least one magnetic bearing supporting the first rotor relative to the first stator, or the second electric generator comprises at least one magnetic bearing supporting the second rotor relative to the second stator.

8. The apparatus of claim 1, wherein at least one of the first electric generator is configured to receive at least a first part of the working fluid from the first turbine wheel and direct the at least first part of the working fluid through the first electric generator to cool the first rotor and the first stator, or the second electric generator is configured to receive at least a second part of the working fluid from the second turbine wheel and direct the at least second part of the working fluid through the second electric generator to cool the second rotor and the second stator.

9. The apparatus of claim 1, wherein at least one of the first electric generator is disposed on the first outlet side of the first turbine wheel, or the second electric generator is disposed on the second outlet side of the second turbine wheel.

10. A generator system for use in a Rankine cycle, comprising:
 a liquid reservoir for a working fluid of the Rankine cycle;
 a pump device coupled to the liquid reservoir to receive the working fluid from the liquid reservoir;
 an evaporator heat exchanger coupled to the pump device to receive the working fluid from the pump and apply heat to the working fluid;
 a first turbine generator apparatus coupled to the evaporator heat exchanger to receive the working fluid from the evaporator heat exchanger and configured to generate electrical energy in response to expansion of the working fluid, the first turbine generator apparatus comprising:
  a first turbine wheel configured to receive the working fluid and rotate in response to expansion of the working fluid flowing from a first inlet side of the first turbine wheel to a first outlet side; and
  a first electric generator having a first stator and a first rotor, the first rotor coupled to the first turbine wheel to rotate at the same speed as the first turbine wheel when the first turbine wheel rotates;
 a second turbine generator apparatus coupled to the first turbine generator apparatus to receive the working fluid from the first turbine generator apparatus and configured to generate electrical energy in response to expansion of the working fluid, the second turbine generator apparatus comprising:
  a second turbine wheel configured to receive the working fluid and rotate in response to expansion of the working fluid flowing from a second inlet side of the second turbine wheel to a second outlet side; and
  a second electric generator having a second stator and a second rotor, the second rotor coupled to the second turbine wheel to rotate at the same speed as the second turbine wheel when the second turbine wheel rotates, and wherein the first outlet side of the first turbine wheel is coupled to the second inlet side of the second turbine wheel; and
a condenser heat exchanger coupled to the second turbine generator apparatus to receive the working fluid from the second turbine generator apparatus and extract heat from the working fluid.

11. The system of claim 10, wherein at least one of the first turbine wheel is configured to receive the working fluid radially into the first inlet side of the first turbine wheel and output the working fluid axially from the first outlet side of the first turbine wheel, or the second turbine wheel is configured to receive the working fluid radially into the second inlet side of the second turbine wheel and output the working fluid axially from the second outlet side of the second turbine wheel.

12. The system of claim 10, wherein the evaporator heat exchanger is in thermal communication with a source of waste heat from a separate process.

13. The system of claim 10, wherein at least one of the first turbine wheel and the first rotor are affixed to a first common shaft, or the second turbine wheel and the second rotor are affixed to a second common shaft.

14. The system of claim 10, wherein at least one of the first stator and the first rotor are isolated from contact with the working fluid, or the second stator and the second rotor are isolated from contact with the working fluid.

15. The system of claim 10, wherein at least one of the first electric generator comprises at least one magnetic bearing supporting the first rotor, or the second electric generator comprises at least one magnetic bearing supporting the second rotor.

16. The system of claim 10, wherein the generator system comprises an organic Rankine cycle.

17. The system of claim 10, wherein at least one of the first electric generator is configured to receive at least a first part of the working fluid from the first turbine wheel and direct the at least first part of the working fluid through the first electric generator to cool the first rotor and the first stator, or the second electric generator is configured to receive at least a second part of the working fluid from the second turbine wheel and direct the at least the second part of the working fluid through the second electric generator to cool the second rotor and the second stator.

18. The apparatus of claim 10, wherein at least one of the first electric generator is disposed on the first outlet side of the first turbine wheel, or the second electric generator is disposed on the second outlet side of the second turbine wheel.

19. A method of circulating a working fluid through a working cycle, comprising:
  vaporizing the working fluid with an evaporator heat exchanger;
  receiving the vaporous working fluid from the evaporator heat exchanger into a first inlet of a first turbine wheel of a first turbine generator apparatus;
  rotating the first turbine wheel in response to expansion of the working fluid through the first turbine wheel, and in turn rotating a first rotor of a first generator of the first turbine generator apparatus at the same speed as the first turbine wheel;
  outputting the working fluid from a first outlet side of the first turbine wheel;
  receiving the vaporous working fluid from the first outlet side of the first turbine wheel into a second inlet of a second turbine wheel of a second turbine generator apparatus;
  rotating the second turbine wheel in response to expansion of the working fluid through the second turbine wheel, and in turn rotating a second rotor of a second generator of the second turbine generator apparatus at the same speed as the second turbine wheel;
  outputting the working fluid from a second outlet side of the second turbine wheel to a condenser heat exchanger; and
  condensing the working fluid to a liquid with the condenser heat exchanger.

20. The method of claim 19, wherein receiving the vaporous working fluid into the first inlet of the first turbine wheel comprises receiving the vaporous working fluid radially into the first inlet of the first turbine wheel, or receiving the vaporous working fluid into the second inlet of the second turbine wheel comprises receiving the vaporous working fluid radially into the second inlet of the second turbine wheel.

21. The method of claim 19, wherein outputting the working fluid from the first outlet side of the first turbine wheel comprises outputting the working fluid axially from the first outlet side of the first turbine wheel, or outputting the working fluid from the second outlet side of the second turbine wheel comprises outputting the working fluid axially from the second outlet side of the second turbine wheel.

22. The method of claim 19, wherein rotating the first rotor comprises rotating a first shaft common to the first turbine wheel and the first rotor, or rotating the second rotor comprises rotating a second shaft common to the second turbine wheel and the second rotor.

23. The method of claim 19, comprising at least one of magnetically supporting the first rotor relative to a first stator of the first generator, or magnetically supporting the second rotor relative to a second stator of the second generator.

24. The method of claim 19, comprising at least one of isolating the working fluid from contact with the first rotor and a first stator of the first generator, or isolating the working fluid from contact with the second rotor and a second stator of the second generator.

25. The method of claim 19, wherein the working cycle is an organic Rankine working cycle.

26. The method of claim 19, comprising at least one of:
  directing at least a first part of the working fluid from the first turbine wheel through the first electric generator to cool the first rotor and the first stator; or
  directing at least a second part of the working fluid from the second turbine wheel through the second electric generator to cool the second rotor and the second stator.

27. The method of claim 19, comprising at least one of outputting the working fluid from the first outlet side of the first turbine wheel toward the first rotor, or outputting the working fluid from the second outlet side of the second turbine wheel toward the second rotor.

* * * * *